United States Patent [19]

McShea, III et al.

[11] Patent Number: 4,483,691

[45] Date of Patent: Nov. 20, 1984

[54] PRODUCTION OF SYNTHETIC NATURAL GAS FROM COAL GASIFICATION LIQUID BY-PRODUCTS

[75] Inventors: William T. McShea, III, Martinsville; Robert M. Yarrington, Westfield, both of N.J.

[73] Assignee: Engelhard Corporation, Iselin, N.J.

[21] Appl. No.: 579,842

[22] Filed: Feb. 13, 1984

Related U.S. Application Data

[63] Continuation of Ser. No. 430,200, Sep. 30, 1982, abandoned.

[51] Int. Cl.³ .......................... C10J 3/16; C10K 3/02; C01B 3/40
[52] U.S. Cl. .................................. 48/202; 48/197 R; 48/214 A; 48/215; 252/373
[58] Field of Search ...................... 48/214 A, 215, 206, 48/202, 197 R; 252/373; 502/326

[56] References Cited

U.S. PATENT DOCUMENTS

| | | | |
|---|---|---|---|
| 3,948,762 | 4/1976 | Hayes | 48/214 A |
| 3,964,882 | 6/1976 | Staudinger | 48/215 |
| 4,134,860 | 1/1979 | Hindin et al. | 502/326 |
| 4,199,327 | 4/1980 | Hempill et al. | 48/202 |
| 4,297,245 | 10/1981 | Bartley et al. | 502/326 |

FOREIGN PATENT DOCUMENTS

| | | | |
|---|---|---|---|
| 1129134 | 5/1962 | Fed. Rep. of Germany | 48/214 A |
| 2303904 | 8/1973 | Fed. Rep. of Germany | 48/214 A |

*Primary Examiner*—S. Leon Bashore
*Assistant Examiner*—K. M. Hastings

[57] ABSTRACT

In coal gasification processes for the production of synthetic natural gas by the reaction of coal with steam and oxygen under pressure to form a gasifier synthesis gas and a liquid hydrocarbon by-product, the liquid hydrocarbon by-product is treated for solids and metal removal and is then passed to a catalytic partial oxidation zone containing a monolithic platinum-palladium catalyst. The hydrocarbon by-product liquids are converted to secondary synthesis gas by being reacted with steam and oxygen. Optionally, the effluent from the catalytic partial oxidation zone may be passed through a second, steam reforming catalyst to react residual hydrocarbons with water to produce hydrogen and carbon oxides. The gasifier and secondary synthesis gases may be treated to remove acid gases therefrom and then methanated to provide a product synthetic natural gas.

31 Claims, 2 Drawing Figures

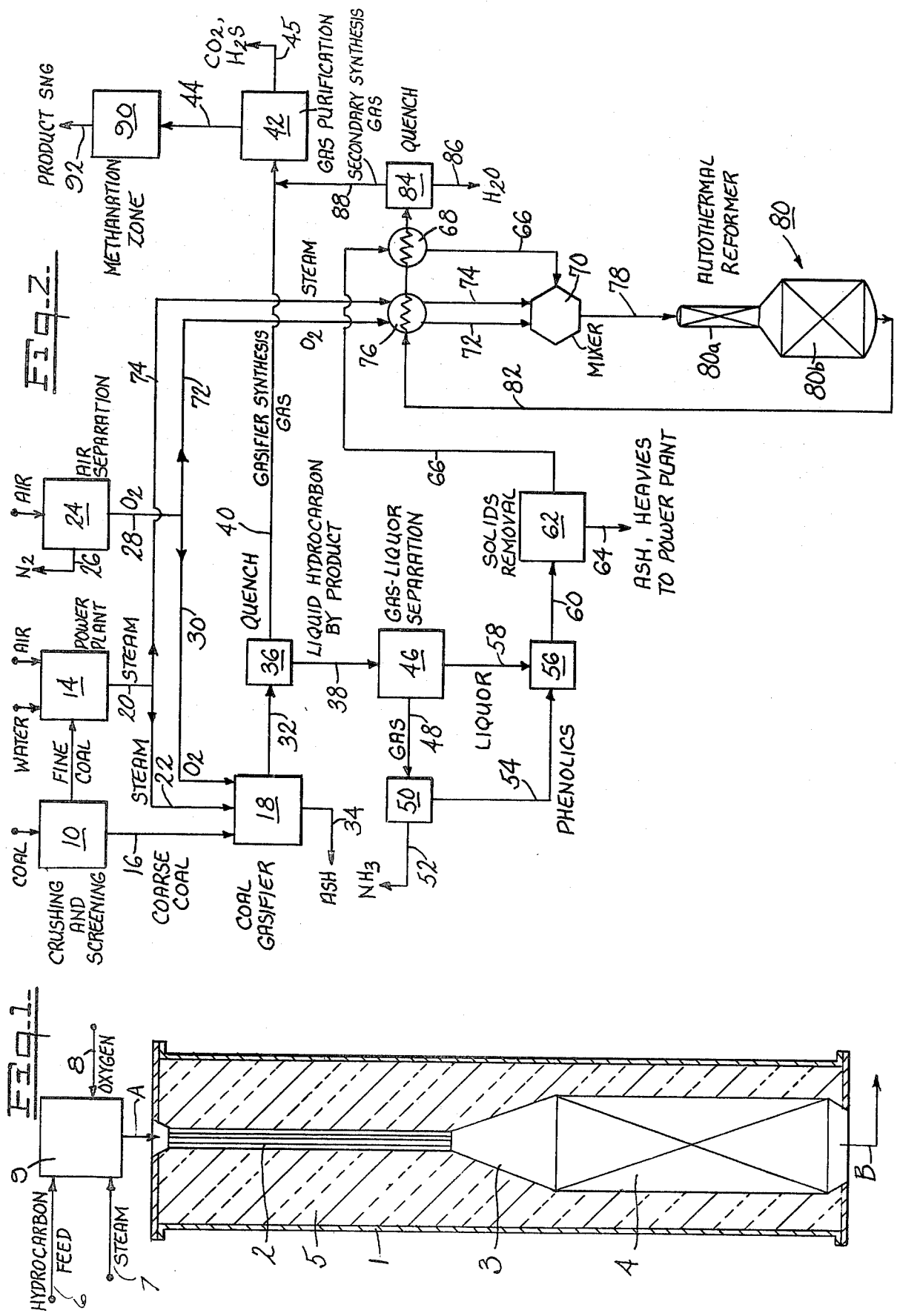

PRODUCTION OF SYNTHETIC NATURAL GAS FROM COAL GASIFICATION LIQUID BY-PRODUCTS

This is a continuation of application Ser. No. 430,200 filed Sept. 30, 1982, now abandoned.

BACKGROUND OF THE INVENTION

The present invention relates to a process for the production of a synthetic natural gas, more particularly, to the production of synthetic natural gas from a secondary synthesis gas, by which term is meant a synthesis gas produced from the coal derived liquid hydrocarbon by-product resulting from the gasification of coal to produce gasifier synthetic natural gas. The secondary synthesis gas is methanated to provide additional synthetic natural gas which may be blended with the gasifier synthetic natural gas.

Coal gasification technology is well known that has been in commercial use in South Africa since about 1954 and was commonly used in the United States prior to 1950 to make town gas. The most commonly employed gasifier process is that developed by Lurgi Kohle und Mineraloeltechnik GmbH, Frankfurt (Main), Federal Republic of Germany. The Lurgi process utilizes a fixed bed gasifier in which coal of a selected particle size is fed into the top of the gasifier countercurrently to a stream of steam and oxygen fed from the botton of the gasifier. A synthesis gas (herein and in the claims called gasifier synthesis gas) and a hydrocarbon liquid by-product are produced from the coal and withdrawn from the top of the gasifier. Solid ash residue is withdrawn through a rotating grate at the bottom of the gasifier. Up to about one fourth of the coal fed to the process will emerge as the liquid hydrocarbon by-product, rather than as the desired gasifier synthesis gas. Thus, a gasification plant using 8 million tons of coal per year may produce as much as about 2 million tons of liquid hydrocarbon by-product.

Such liquid hydrocarbon by-product essentially comprise three major fractions classified as oil, tar and phenolics. The oil fraction has a boiling range of about 200°–600° F. (93°–316° C.) and requires treatment if it is to be employed as a petroleum product substitute. The tar contains substantial quantities of oxygen and nitrogen and about 0.01 percent ash. The phenolics are somewhat similar to cresols and have a boiling range of about 290°–400° F. (143°–205° C.). Generally, these by-products are not particularly valuable and do not command a high price even in those areas where a market exists for them. The liquid hydrocarbon by-product is also carcinogenic and toxic. Disposition of the by-product when no market exists for it presents significant environmental and economic problems.

The present invention enables the conversion of such liquid hydrocarbon by-product into additional synthesis gas (herein and in the claims called secondary synthesis gas). This "secondary synthesis gas" (sometimes herein abbreviated to "secondary SG") is to be distinguished from the "gasifier synthesis gas" (sometimes herein abbreviated to "gasifier SG") which is obtained in the coal gasification step. Methanation of the gasifier SG and secondary SG is carried out to provide product synthetic natural gas (sometimes herein abbreviated to "SNG"). As explained below, the conversion of the liquid hydrocarbon by-product to secondary SG is carried out by a catalytic partial oxidation process in which steam reforming and hydrocracking reactions are believed to also take place, and to provide an efficient and economical means of converting the liquid hydrocarbon by-product.

Steam reforming is a well known method for treating hydrocarbons to generate hydrogen therefrom. It is usually carried out by supplying heat to a mixture of steam and a hydrocarbon feed while contacting the mixture with a suitable catalyst, usually nickel. Steam reforming is generally limited to paraffinic naphtha and lighter feeds which have been de-sulfurized and treated to remove nitrogen compounds, because of difficulties in attempting to steam reform heavier hydrocarbons and the poisoning of steam reforming catalysts by sulfur and nitrogen compounds.

Another known method of obtaining hydrogen from a hydrocarbon feed is partial oxidation, in which the hydrocarbon feed is introduced into an oxidation zone maintained in a fuel rich mode so that only a portion of the feed is oxidized.

It is known that steam may also be injected into the partial oxidation reactor vessel to react with the feed and with products of the partial oxidation reaction. The process is not catalytic and requires high temperature to carry the reactions to completion, resulting in a relatively high oxygen consumption. On the other hand; the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineers' 90th National Meeting, Houston, Tex., Apr. 5–9, 1981. Autothermal reforming is defined therein as the utilization of catalytic parital oxidation in the presence of added steam, which is said to increase the hydrogen yield because of simultaneous (with the catalytic partial oxidation) steam reforming being attained. The paper discloses utilization of a particular bed of three different nickel catalysts into which steam, air and a hydrocarbon fuel supply comprising a No. 2 fuel oil are injected. The resulting product gases contain hydrogen and carbon oxides.

In *Brennstoff-Chemie* 46, No. 4, p. 23 (1965), a German publication, Von P. Schmulder describes a Badische Anilin and Soda Fabrik (BASF) process for autothermal reforming of gasoline. The process utilizes a first, pelletized, i.e., particulate, platinum catalyst zone followed by a second, pelletized nickel catalyst zone. A portion of the product gas is recycled to the process.

Disclosure of the utilization of a noble metal catalyzed monolith to carry out catalytic partial oxidation to convert more than half of the hydrocarbon feed stock upstream of a steam reforming zone is disclosed in an abstract entitled *Evaluation of Steam Reforming Catalyst for use in the Auto-Thermal Reforming of Hydrocarbon Feed Stocks* by R. M. Yarrington, I. R. Feins, and H. S. Hwang (National Fuel Cell Seminar, July 14–16, 1980, San Diego). The abstract noted the unique ability of rhodium to steam reform light olefins with little coke formation and noted that results were obtained for a series of platinum-rhodium catalysts with various ratios of platinum to total metal in which the total metal content was held constant.

U.S. Pat. No. 4,054,407, assigned to the assignee of this application, discloses two-stage catalytic oxidation using platinum group metal catalytic components dispersed on a monolithic body. At least the stoichiometric amount of air is supplied over the two stages and steam is not employed.

U.S. Pat. No. 3,481,722, assigned to the assignee of this application, discloses a two stage process for steam reforming normally liquid hydrocarbons using a platinum group metal catalyst in the first stage. Steam and hydrogen, the latter of which may be obtained by partially cracking the hydrocarbon feed, are combined with the feed to the process.

SUMMARY OF THE INVENTION

In accordance with the present invention there is provided in a coal gasification process in which coal is reacted with steam and oxygen to produce (i) a gasifier synthesis gas which is methanated to produce a synthetic natural gas, and (ii) a liquid hydrocarbon by-product, the improvement of preparing a secondary synthesis gas from the liquid hydrocarbon by-product, which secondary synthesis gas may be methanated to form additional synthetic natural gas, by the following steps: preheating an inlet stream comprising the liquid hydrocarbon by-product, $H_2O$ and oxygen to a preheat temperature which is preferably at least 800° F. (427° C.) but in any case sufficiently high to initiate catalytic oxidation of the hydrocarbon by-product as defined below, but less than about 1200° F. (649° C.); introducing the preheated inlet stream into a first catalyst zone comprising a monolithic body having a plurality of gas flow passages extending therethrough and comprising palladium and platinum catalytic components and optionally rhodium catalytic component dispersed therein, the amounts of hydrocarbon by-product, $H_2O$ and oxygen introduced into the first catalyst zone being controlled to maintain an $H_2O$ to C ratio of from about 0.5 to 5 and an $O_2$ to C ratio from about 0.15 to 0.4 in the inlet stream; contacting the preheated inlet stream within the first catalyst zone with the aforesaid catalytic component to initiate and sustain therein catalytic oxidation of a quantity, substantially less than all, of the hydrocarbon by-product sufficient to attain a temperature within the first catalyst zone at least high enough to crack substantially all unoxidized $C_4$ or heavier hydrocarbons in the by-product to $C_1$ to $C_4$ hydrocarbons, the temperature of at least a portion of said monolithic body being at least 250° F. (139° C.) higher than the ignition temperature of said inlet stream, but not more than about 2000° F. (1093° C.), whereby to produce a first catalyst zone effluent comprising methane, hydrogen, carbon monoxide, carbon dioxide and $H_2O$; passing the effluent to a treatment zone for the removal of carbon dioxide and water therefrom and withdrawing the treated first catalyst zone effluent as secondary synthesis gas product; and methanating the gasifier synthesis gas and the secondary synthesis gas to provide synthetic natural gas therefrom.

In one aspect of the present invention, there is included the step of passing the first catalyst zone effluent, while still at an elevated temperature, from the first catalyst zone to a second catalyst zone containing a steam reforming catalyst, preferably comprising platinum and rhodium catalytic components, and contacting the first zone effluent in the second catalyst zone with the steam reforming catalyst to react hydrocarbons therein with $H_2O$ to produce hydrogen and carbon oxides therefrom, and then passing the effluent of the second catalyst zone as the effluent to the aforesaid treatment zone for the removal of carbon dioxide and water therefrom.

In preferred aspects of the invention, at least about 50% by weight of the hydrocarbon by-product is converted to $C_1$ hydrocarbons in the first catalyst zone and/or a total of at least about 98% by weight of hydrocarbon by-product is converted to $C_1$ hydrocarbons in the first and second catalyst zones.

In another aspect of the invention, the effluent of the first catalyst zone may be substantially entirely depleted of oxygen and the secondary synthesis gas may be combined with the gasifier synthesis gas to provide a combined product synthesis gas.

In another aspect of the invention, the first catalyst zone is maintained at a temperature of from about 1400° F. to 2000° F. (760° C. to 1093° C.) and the first zone effluent is introduced into the second catalyst zone at substantially the same temperature. A volumetric hourly rate of at least 100,000 volumes of throughput per volume of catalyst may be maintained in the first catalyst zone and a volumetric hourly rate of from about 2,000 to 20,000 volumes of throughput per volume of catalyst may be maintained in the second catalyst zone, and the process of making the secondary SG may be carried out at a pressure of from about 50 psig to 1500 psig.

In one aspect of the invention, the liquid hydrocarbon by-product is treated to remove ash and metals, if any, and the heaviest portion of the tars therein, prior to being passed to the first catalyst zone.

BRIEF DESCRIPTION OF THE DRAWINGS

FIG. 1 is a schematic elevation view in cross section of a laboratory or pilot plant size embodiment of an autothermal reformer apparatus utilizable in accordance with the present invention; and FIG. 2 is a schematic flow sheet diagram of a coal gasification plant, including an autothermal reforming section for converting liquid hydrocarbon by-product from the coal gasifier to secondary synthetic natural gas.

DESCRIPTION OF THE PREFERRED EMBODIMENTS

In a preferred embodiment of the present invention, a coal gasifier plant includes a section for making a secondary SG, which section includes an autothermal reformer. By incorporating the secondary SG section into the coal gasification plant, a greater quantity of product SG can be obtained with the same size coal gasifier plant or a smaller plant can be utilized to produce a given total product synthetic natural gas (SNG) while consuming an environmentally damaging substance.

In a preferred embodiment of the present invention, at least a first catalyst zone is provided for carrying out catalytic partial oxidation, an exothermic reaction, and a second catalytic zone is optionally provided for carrying out steam reforming, an endothermic reaction. Steam reforming, as well as hydrocracking of heavier hydrocarbons, also appears to take place in the first catalyst zone so that under certain conditions a second catalyst zone specifically for steam reforming is not required. Such steam reforming as takes place in the first catalyst zone absorbs some of the heat generated by the partial oxidation step and tends to moderate the operating temperature attained. The net reaction in the first catalyst zone is however exothermic. The exothermic, first catalyst zone comprises a monolithic catalyst carrier on which a platinum group metal catalyst is dispersed. Such catalyst can effectively catalyze the partial oxidation and steam reforming of the liquid hydrocarbon by-product, resulting in hydrogen being formed. As compared to a non-catalytic combustion process, such as conventional non-catalytic partial oxidation, catalytic partial oxidation enables the utilization of lesser amounts of oxygen and lower temperature levels to both oxidize and hydrocrack the liquid hydrocarbon by-product to lighter hydrocarbon fractions. Nonetheless, the temperature of the reactant mass is sufficiently elevated for the optional subsequent steam reforming step, in those cases where steam reforming is required. At the temperatures maintained in the catalytic oxidation zone, and in the presence of the product hydrogen and catalyst utilized in the first zone, hydrocracking of the unoxidized $C_2$ and heavier hydrocarbons takes place to form primarily $C_1$ hydrocarbons, with minor amounts of $C_2$ and $C_3$ compounds. The effluent gas from the first catalyst zone contains primarily $H_2$, $H_2O$, $CH_4$, $CO$ and $CO_2$ and, depending upon the sulfur content of the liquid hydrocarbon by-product, $H_2S$ and $COS$.

The endothermic, second catalyst zone may contain any suitable steam reforming platinum group metal catalyst. Usually, the steam reforming catalyst will be utilized in the form of a particulate bed comprised of spheres, extrudates, granules, configured packing material, e.g., rings, saddles or the like, or any suitable shape. Obviously, a combination of different types of particulate materials may be utilized as the steam reforming catalyst. Further, a monolithic catalyst carrier may also be used in the second catalyst zone, as is used in the first catalyst zone.

The process of the present invention provides a simpler and less expensive means of converting the liquid hydrocarbon by-product of a coal gasification process, e.g., the Lurgi coal gasification process than the conventional partial oxidation or steam reforming processes. The combination of features provided by the present invention provides a highly efficient and flexible method of effectuating the conversion. The low pressure drop and high volumetric rate throughput of a monolithic body platinum group metal catalyst provides a reduced size and volume of catalyst. The use of platinum group metals as the catalytic metal requires a very low catalytic metal loading as compared to use of base metal catalyst. This provides good overall economies in reduced equipment size and enhanced throughput rates despite the much higher unit weight cost of platinum group metals as compared to base metals. The combination of the monolithic platinum group metal partial oxidation catalyst with a platinum group metal steam reforming catalyst enables operations at relatively very low $O_2$ to C ratios without carbon deposition fouling the catalyst, which is important in attaining enhanced $CH_4$ production in the process. Use of platinum group metal catalysts also enhances resistance of the catalyst to poisoning by sulfur compounds and enhance the ability of the catalyst to treat the aromatics in the liquid hydrocarbon by-product.

THE MONOLITHIC PARTIAL OXIDATION CATALYST

The partial oxidation catalyst is provided on monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert rigid material which is capable of maintaining its shape and a sufficient degree of mechanical strength at high temperatures, for example, up to about 3,272° F. (1,800° C.). Typically, a material is selected for the support which exhibits a low thermal coefficient of expansion, good thermal shock resistance and, though not always, low thermal conductivity. Two general types of material of construction for such carriers are known. One is a ceramic-like porous material comprised of one or more metal oxides, for example, alumina, alumina-silica, alumina-silica-titania, mullite, cordierite, zirconia, zirconia-spinel, zirconia-mullite, silicon carbide, etc. A particularly preferred and commercially available material of construction is cordierite, which is an alumina-magnesia-silica material and well suited for operations below about 2,000° F. (1,093° C.). Honeycomb monolithic supports are commercially available in various sizes and configurations. Typically, the monolithic carrier would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to 1,200, preferably, 200–600 gas flow channels per square inch of face area.

The second major type of preferred material of construction for the carrier is a heat- and oxidation-resistant metal, such as a stainless steel or the like. Monolithic supports are typically made from such materials by placing a flat and a corrugated metal sheet one over the other and rolling the stacked sheets into a tubular configuration about an axis parallel to the corrugations, to provide a cylindrical-shaped body having a plurality of fine, parallel gas flow passages extending therethrough. The sheets and corrugations are sized to provide the desired number of gas flow passages, which may range, typically, from about 200 to 1,200 per square inch of end face area of the tubular roll.

Although the ceramic-like metal oxide materials such as cordierite are somewhat porous and rough-textured, they nonetheless have a relatively low surface area with respect to catalyst support requirements and, of course, a stainless steel or other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, III, and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. As used herein and in the claims, "transition alumina" includes gamma, chi, eta, kappa, theta and delta forms and mixtures thereof. An alumina comprising or predominating in gamma alumina is the most preferred support layer. It is known that certain additives such as, e.g., one or more rare earth metal oxides and/or alkaline earth metal oxides may be included in the transition alumina (usually in amounts comprising from 2 to 10 weight percent of the stabilized coating) to stabilize it against the generally undesirable high temperature phase transition to alpha alumina, which is of a relatively low surface area. For example, oxides of one or more of lanthanum, cerium, praseodymium, calcium, barium, strontium and magnesium may be used as a stabilizer. The specific combination of oxides of lanthanum and barium is a preferred stabilizer for transition alumina.

As used herein and in the claims, the term "platinum group metal" means platinum, palladium, rhodium, iridium, osmium, and ruthenium. The platinum group metal used may optionally be supplemented with one or more base metals, particularly base metals of Group VII and metals of Groups VB, VIB and VIIB of the Periodic Table of Elements. Preferably, one or more of chromium, copper, vanadium, cobalt, nickel and iron may be employed.

Desirable catalysts for partial oxidation should have the following properties: They should be able to operate effectively under conditions varying from oxidizing at the inlet to reducing at the exit; they should operate effectively and without significant temperature degradation over a temperature range of about 800° F. to about 2400° F. (427° C. to 1315° C.); they should operate effectively in the presence of carbon monoxide, olefins and sulfur compounds; they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poisons as sulfur and halogen compounds; further, all of these requirements must be satisfied simultaneously. For example, in some otherwise suitable catalysts, carbon monoxide may be retained by the catalyst metal at low temperatures thereby decreasing or modifying its activity. The combined platinum and palladium is a highly efficient oxidation catalyst for the purposes of the present invention. Generally, the catalyst activity of platinum-palladium combination catalysts is not simply an arithmetic combination of their respective catalytic activities; the disclosed range of proportions of platinum and palladium have been found to possess the previously described desirable properties and, in particular, provide efficient and effective catalytic activity in treating a rather wide range of hydrocarbonaceous, particularly hydrocarbon, feeds with good resistance to high temperature operation and catalyst poisons. The following data compare the effectiveness of palladium, rhodium and platinum, respectively, for the oxidation of methane and further compares the efficacy of, respectively, palladium-platinum, palladium-rhodium and platinum-rhodium combined catalysts for oxidation of methane.

The catalysts of Table I-A comprise a lanthia-chromia-alumina frit impregnated with the platinum group metals by techniques as described above. The frit has the following composition:

| Component | Weight Percent |
|---|---|
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four fours at 1600° F. Three catalysts of different platinum metal loadings were prepared as follows:

| Sample No. | Weight Percent | | | |
|---|---|---|---|---|
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 |

The resultant platinum group metal (PGM) impregnated alumina frit was deposited on alumina beads and the thus-coated beads were placed in a shallow bed and tested by passing a 1% (volume) methane 99% (volume) air feed at about atmospheric pressure through the catalyst. An electric heater was used to cyclically heat the test gas stream fed to the catalyst, and conversion results at the indicated temperatures were obtained on both the heating and cooling phases of each heat cycle. The results are shown in the following Table I-A.

TABLE I-A

| Sample No. | PGM (Mole Ratio) | Ignition Temp. °F. | Weight Percent of Original Methane Content Converted at Indicated Temperature (°F.) | | | | | |
|---|---|---|---|---|---|---|---|---|
| | | | 600° | 700° | 800° | 900° | 1000° | 1100° |
| 4063U-1 | Pd,Pt (1:1) | 610 | — | 3 | 10 | 26 | 60 | 80 |
| 4063R-1 | Pd,Rh (1:1) | 710 | — | — | 2 | 5 | 9 | 12 |
| 4063V-1 | Pt,Rh (1:1) | 730 | — | — | 1 | 1 | 3 | 5 |

These data demonstrate the ability of platinum-palladium to promote catalytic oxidation over a wide range of temperatures.

Rhodium may optionally be included with the platinum and palladium. Under certain conditions, rhodium is an effective oxidation as well as a steam reforming catalyst, particularly for light olefins. The combined paltinum group metal catalysts of the invention also have a significant advantage in the ability to catalyze the autothermal reactions at quite low ratios of $H_2O$ to carbon (atoms of carbon in the feed) and oxygen to carbon, without significant carbon deposition on the catalyst. This important feature provides flexibility in selecting $H_2O$ to C and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present, or as compounds such as an oxide of the platinum group metal. As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form. Table I-A demonstrates that the palladium-rhodium and platinum-rhodium combinations are rather ineffective for methane oxidation. The effectiveness of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well above 1100° F., which would probably also reduce the effectiveness of rhodium for methane oxidation.

The tests in which the results of Table I-A were developed used a bed of the platinum group metal-impregnated frit dispersed on alumina beads, rather than a monolithic body on which the frit is dispersed. The bed of frit-coated beads was of shallow depth to avoid excessive pressure drop. The geometric configuration of a 400 cell/in$^2$ monolithic body provides more geometric surface area exposed to the reactant gas than does a bed of coated beads. Since the catalytic partial oxidation reactions of this invention are extremely rapid at the temperatures involved, the catalytic metals which reside on or near the surface of the catalyst body are predominantly involved in the reactions. The results of the tests with coated beads are indicative of results with monolithic bodies, but lower catalytic metal loading can be used with the latter as compared to metal loadings on beads, to attain equivalent results.

Table I-B shows the results of testing a monolithic body-supported catalyst on which a ceria-stabilized alumina frit impregnated with the indicated platinum group metals was dispersed upon a monolithic support. The alumina frit comprised 5% by weight CeO$_2$, balance Al$_2$O$_3$, impregnated with one or two platinum group metals to provide the PGM loadings indicated in Table I-B. The catalyst was calcined in air at 500° C. for two hours and then was aged 24 hours at 1800° F. in air.

Two different test gases, A and B, having the following composition were passed through the catalyst:

| COMPOSITION | PARTS PER MILLION (VOL) OR VOLUME PERCENT | |
|---|---|---|
| | A | B |
| O$_2$ | 3% | 3% |
| CO | 1% | 1% |
| CO$_2$ | 10% | 10% |
| H$_2$O | 10% | 10% |
| NO | 500 ppm | 500 ppm |
| C$_2$H$_4$ | 300 ppm | — |
| C$_3$H$_8$ | — | 300 ppm |
| N$_2$ | balance | balance |

Table I-B indicates the temperature in degrees centigrade for conversion of 50% by weight of the original amount of the component present, indicated under the column heading T$_{50}$, and the temperature required for 75% by weight conversion, under the heading T$_{75}$. A lower temperature accordingly indicates a more active catalyst. The results obtained are as follows; the platinum group metal (PGM) loading on the monolithic support is shown as grams of platinum group metal per cubic inch of monolithic catalyst.

TABLE I-B

| | | PGM | |
|---|---|---|---|
| Catalyst Sample No. | Weight Ratio Pt:Pd | PGM Loading (Pt/Pd (g/in$^3$)) | Total PGM Loading (g/in$^3$) |
| 1. | 100:0 | .051/— | .051 |
| 2. | 82:18 | .044/.010 | .054 |
| 3. | 58:42 | .027/.019 | .046 |
| 4. | 25:75 | .011/.031 | .042 |
| 5. | 0:100 | —/.039 | .039 |
| 6. | 11:89 | .003/.025 | .028 |
| 7. | 100:0 | .035/— | .035 |
| 8. | 70:30 | .034/.014 | .048 |

| | Test Gas A | | | | Test Gas B | | | |
|---|---|---|---|---|---|---|---|---|
| Component | CO | | C$_2$H$_4$ | | CO | | C$_3$H$_8$ | |
| Percent Conversion | T$_{50}$ | T$_{75}$ | T$_{50}$ | T$_{75}$ | T$_{50}$ | T$_{75}$ | T$_{50}$ | T$_{75}$ |
| Catalyst Sample No. | °C. | | °C. | | °C. | | °C. | |
| 1. | 325 | 335 | 325 | 335 | 265 | 275 | 470 | 565 |
| 2. | 270 | 275 | 280 | 290 | 280 | 285 | 545 | 615 |
| 3. | 235 | 250 | 260 | 305 | 260 | 265 | 495 | 640 |
| 4. | 235 | 245 | 260 | 320 | 260 | 270 | 465 | 585 |
| 5. | 230 | 235 | 245 | 270 | 245 | 255 | 440 | 510 |
| 6. | 270 | 275 | 275 | 315 | 245 | 255 | 430 | 555 |
| 7. | 345 | 355 | 350 | 365 | 320 | 330 | 495 | 550 |
| 8. | 255 | 265 | 265 | 290 | 245 | 250 | 485 | 585 |

The data of Table I-B demonstrate the lower temperatures at which a palladium containing catalyst will attain, respectively, 50% and 75% conversion of ethylene as compared to a platinum only catalyst. As mentioned above, the presence of platinum in addition to palladium provides effective catalyzation of other species as well as providing enhanced poison resistance.

An exemplary mode of preparation of partial oxidation catalyst compositions utilizable in accordance with the present invention is set forth in the following Example 1.

EXAMPLE 1

(a) To 229 g of 2.5 wt % lanthia, 2.5 wt % baria—95 wt % Al$_2$O$_3$ powder (a predominantly gamma alumina which has been stabilized by incorporation of lanthia and baria therein) is added a solution containing 20 g Pt as H$_2$Pt(OH)$_6$ solubilized in monoethanolamine so as to give total volume of 229 ml. After mixing for 5 minutes, 25 ml of glacial acetic acid is added and the material is mixed an additional 5 minutes before being dried and then calcined for one and one-half hours at 350° C. in air to form a free flowing powder.

(b) Similarly, to 229 g of 2.5 wt % lanthia, 2.5 wt % baria—95 wt % Al$_2$O$_3$ powder there is added 21 g Pd as Pd(NO$_3$)$_3$. The material is mixed and reduced with 16 ml of N$_2$H$_4$.H$_2$O solution with constant mixing. The impregnated powder is dried and then calcined for one and one-half hours at 375° C. in air.

(c) Two hundred gram of each of powder (a) and (b) is added to a ½ gallon size ball mill with appropriate amount of grinding media. To the powder is added 20 ml of glacial acetic acid and 550 ml of H$_2$O. The sample is ball milled for 16 hours. The resulting slurry has a solids content of 43%, a pH of 4.0 and a viscosity of 337 cps and is used to coat a Corning cordierite monolith having a diameter of 3.66", a length of 3" and 400 gas flow passages (of square cross section) per square inch of end face area. The coating is accomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238 g of platinum group metal per cubic foot of catalyst body volume at a weight ratio fo platinum to palladium of 1:1, with the platinum group metal dispersed on a ceria-stabilized alumina "washcoat" support layer. The catalyst body contains 1.64 grams per cubic inch of catalyst body of stabilized alumina washcoat.

A series of partial oxidation catalyst compositions utilizeable in accordance with the present invention were prepared by substantially the procedure described in Example 1, with appropriate modifications to obtain the reported loadings of different catalyst metals. Each of the below described materials is a monolithic catalyst composition. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark Torvex by DuPont, and having 64 gas flow channels per square inch of end face area. The Corning cordierite monoliths have gas flow channels which are square in cross section; those of the Torvex monolith are hexagonal in cross section. The amount of platinum group metal on the catalyst is given in grams of elemental platinum group metal per cubic foot of monolith catalyst and the amount of refractory metal oxide coating is given in grams per cubic inch of monolith catalyst. The weight ratio of the platinum group metals in the order listed is given in parentheses. Thus, catalyst CPO-1 in Table I, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft$^3$ | Weight % and Stabilizer in Support Coating | Alumina Support Coating g/in$^3$ (% Stabilizer) |
|---|---|---|---|---|
| CPO-1 | Pt, Pd (1:1) | 219 | 5% ceria | 1.27 |
| CPO-2 | Pt, Pd (1:1) | 186 | 5% ceria | 1.64 |
| CPO-3 | Pt, Pd (1:4) | 275 | 5% ceria | 1.79 |
| CPO-4 | Pt, Pd (1:1) | 310 | 5% ceria | 2.32 |
| CPO-5(*) | Pt, Pd (1:1) | 200 | 5% ceria | 1.26 |
| CPO-6 | Pt, Pd, Rh (9.5:9.51) | 230 | 5% ceria | 1.47 |
| CPO-7 | Pt, Pd (1:1) | 186 | 2.5% lanthia 2.5% baria | 1.64 |

(*)TORVEX alpha alumina monolith; all others are cordierite monoliths.

Generally, the most preferred catalysts comprise platinum and palladium catalyst components and combinations thereof, with other platinum group metal catalytic components, preferably, combinations comprising 10–90% by weight palladium, preferably 25–75%, more preferably 40 to 60%, by weight palladium, and 90 to 10% by weight platinum, preferably 75 to 25%, more preferably 60 to 40%, by weight platinum. Generally, as the sulfur content of the hydrocarbon feed being treated in the first catalyst zone increases, a higher proportion of platinum to palladium is preferred. On the other hand, for feeds which have a relatively high methane content, an increasing proportion of palladium is preferred.

The monolithic configuration of the catalytic partial oxidation catalyst of the first catalyst zone affords a relatively low pressure drop across it as compared to the packed bed of a particulate support catalyst. This is particularly important in view of the increase in gas volume occasioned by the reactions taking place in the first catalyst zone. The total moles of product produced in the first catalyst zone is higher than the total moles of the inlet stream introduced therein. The individual gas flow passages of the monolith also serve, in effect, as individual adiabatic chambers, thus helping to reduce heat loss and promote hydrocracking. This is particularly so when the monolithic carrier comprises a ceramic-like material such as cordierite which has generally better heat insulating properties than do the metal substrates and, to this extent, the ceramic-type monolithic carriers are preferred over the metal substrate monolithic carriers. Further, as the monolith body becomes heated during operation, the gas in the upstream portion of the monolith is preheated by the heat which is transferred back from the downstream catalytic partial oxidation to the inlet thus facilitating desired hydrocracking and oxidation reactions.

STEAM REFORMING CATALYST

The steam reforming catalyst utilized in the second catalyst zone in accordance with the present invention may utilize a monolithic carrier as described above in connection with the partial oxidation catalyst or it may comprise a particulate support such as spheres, extrudates, granules, shaped members (such as rings or saddles) or the like. As used herein and in the claims, the term "particulate catalyst" or the like means catalysts of regularly or irregularly shaped particles or shaped members or combinations thereof. A preferred particulate support is alumina pellets or extrudate having a BET (Brunnauer-Emmett-Teller) surface area of from about 10 to 200 square meters per gram. Alumina or alumina stabilized with rare earth metal and/or alkaline earth metal oxides as described above, may be utilized as the pellets or extrudate. An alumina particulate support stabilized with lanthanum and barium oxides as described above is preferred.

The catalytically active metals for the optional steam reforming catalyst comprise the well known base metals (e.g., nickel) as well as platinum group metals, as stated above. A preferred platinum group metal steam reforming catalyst is a combination of platinum plus rhodium catalytic components with the rhodium comprising, on an elemental metal basis, from about 10 to 90% by weight, preferably 20 to 40% by weight, and the platinum comprising 90 to 10% by weight, preferably 80 to 60% by weight. The proportion of platinum and rhodium utilized will depend on the type of hydrocarbon feed to be treated in the process. Other platinum group metals may be utilized.

EXAMPLE 2

(a) A barium nitrate solution is prepared by dissolving 159.9 g Ba(NO$_3$)$_2$ in 1,650 ml of H$_2$O. Lanthanum nitrate, in the amount of 264.9 g La(NO$_3$)$_2$.6H$_2$O is dissolved in the barium nitrate solution by mixing vigorously to yield a barium-lanthanum solution, to which is added to 3,000 g of high surface area gamma alumina powder. The solution and powder are throughly mixed in a sigma blade mixer for 30 minutes.

(b) The impregnated alumina resulting from step (a) was extruded through 1/16" diameter dies so as to give 1/16" diameter extrudate in lengths from ¼" to ⅜".

(c) The extrudates from step (b) were dried at 110° C. for 16 hours and then calcined 2 hours at 1,050° C. in air.

(d) A platinum-rhodium solution was prepared by dissolving 42.6 g Pt as H$_2$Pt(OH)$_6$ in monoethanolamine and 18 g Rh as Rh(NO$_3$)$_3$.2H$_2$) and combining the materials in H$_2$O to provide a solution having a volume of 1,186 ml and a pH of 0.7 after adjustment with concentrated $HNO_3$.

(e) The platinum-rhodium solution of step (d) is added to the extrudate obtained in step (c) in a tumbling coater and mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on $La_2O_3$—BaO stabilized gamma alumina extrudate.

The catalysts of Examples 1 and 2 were utilized in test runs. Before describing these test runs, however, preferred embodiments of the apparatus of the present invention are described in some detail below.

THE REACTOR VESSEL

Preferably, the reactor utilized in the autothermal reforming process of the invention comprises a fixed bed, adiabatic reactor. FIG. 1 shows a somewhat schematic rendition of a preferred laboratory or pilot plant size reactor comprising a unitary vessel 1 within which a monolithic carrier parital oxidation catalyst 2 is disposed in flow communication via a passageway 3 with a bed of steam reforming catalyst 4. The vessel is suitably insulated by thermal insulating material 5 to reduce heat losses and to provide essentially a fixed bed, adiabatic reactor. Inlet lines 6, 7 and 8 feed a mixer 9 with, respectively, a hydrocarbon feed, steam and oxygen. The admixed reactants are introduced through an inlet line A into partial oxidation catalyst 2, thence via passage 3 into steam reforming bed 4 from which the contacted material is withdrawn through outlet line B. Valves, flow meters and heat exchange units, utilized in a manner known to those skilled in the art, are not shown in the schematic illustration of FIG. 1.

Typically, in the apparatus of FIG. 1, the monolithic carrier catalyst 2 is of cylindrical configuration, three quarters of an inch (1.9 cm) in diameter and nine inches (22.9 cm) long. The steam reforming bed is a cylindrical bed of particulate catalyst three inches (7.62 cm) in diameter by nine and a quarter inches (23.5 cm) long. In operation, reactants are preheated with the oxidant stream being preheated separately from the hydrocarbon feed as a safety measure. After preheating, the streams were intimately mixed and immediately fed into the partial oxidation catalyst 2 of vessel 1. Generally, all the oxygen present in the feed reacts within monolithic catalyst bed 2 to oxidize a portion, but not all, of the hydrocarbon feed, resulting in an increase in temperature due to the exothermic oxidation reaction. The heavier hydrocarbons are hydrocracked in catalyst bed 2 to lighter, predominantly $C_1$ hydrocarbons. The heated, partially oxidized and hydrocracked effluent from catalyst bed 2 is then passed through steam reforming catalyst bed 4 wherein the steam reforming reaction takes place. The product gases withdrawn via outlet B are cooled and unreacted water as well as any unreacted hydrocarbon feed, if any, is condensed and removed therefrom. The dry gas composition may be monitored by gas chromatography. The same principles of operation are followed in commercial embodiments of the apparatus.

Referring now to FIG. 2, there is shown a schematic flow sheet illustration of a coal gasifier plant including an autothermal reforming section utilized to convert the liquid hydrocarbon by-product to secondary SG. A typical coal gasification plant, such as one according to the Lurgi design, includes a coal crushing and screening zone 10 to which coal is conveyed by suitable means for crushing and screening to segregate the coal particles by size, and any other treatments such as washing, etc. which may be required. Finely crushed coal is transmitted by means 12 to a power plant 14 to which water and air is supplied and in which the coal is burned to generate steam and electric power required in operation of the plant.

A coarse coal stream is fed via means 16 to a coal gasifier 18. Coal gasifier 18 may be of any suitable design, such as a Lurgi fixed bed reactor with rotating bottom grate, as briefly described above. Steam is transmitted via lines 20, 22 from power plant 14 to coal gasifier 18.

An air separation plant 24 is supplied with air and, by any suitable technique, separates an oxygen stream from the air. Nitrogen is removed via line 26 and oxygen transmitted via lines 28, 30 to coal gasifier 18. It will be understood that in the case of the Lurgi coal gasifier design, as mentioned above, the steam and oxygen are transmitted through the gasifier countercurrently to descending stream of course coal particles. Under the conditions of temperature and pressure maintained in coal gasifier 18, gasifier SG is generated in coal gasifier 18, together with a liquid hydrocarbon by-product, both of which are removed from coal gasifier 18 via line 32. Ash is removed from coal gasifier 18 via line 34. The gasifier SG and liquid hydrocarbon by-product are quenched in quench zone 36 from which the liquid hydrocarbon by-product is removed via line 38. The gasifier SG is transmitted via line 40 to a gas purification zone 42 in which carbon dioxide and hydrogen sulfide are removed therefrom by any suitable, known treatment.

The liquid hydrocarbon by-product is transmitted via line 38 to a gas-liquor separation zone 46 in which a gaseous fraction largely comprising ammonia and gasified phenolics is separated and removed via line 48 to a phenols separation zone 50, wherein off-gases including ammonia are separated and removed via line 52. The phenolics are transmitted via line 54 to a blending zone 56 wherein the recovered phenolics are combined with the liquor separated from gas-liquor separation zone 46 via line 58.

A typical composition for the liquid hydrocarbon by-product, comprising the re-combined phenolics and liquor in line 60, is given in Table II.

TABLE II

| Composition of Typical Hydrocarbon Liquid By-Product. | | |
|---|---|---|
| Component | Average Formula | Average Molecular Weight |
| (1) Oil | $C_{13.5}H_{18}$ | 180 |
| (2) Tar | $C_{11}H_{10}O$ | 158 |
| (3) Phenolics | $C_7H_8O$ | 108 |
| (4) Blend of (1),(2) and (3) | $C_{11}H_{14.3}O$ | 162 |

The hydrocarbon by-product is transmitted via line 60 to a solids removal zone 62 wherein ash and heavy tar components are separated and removed via line 64. The hydrocarbon by-product may be treated by any suitable technique such as filtration and/or distillation for solids removal in zone 62. In such process, metals and residual ash in the hydrocarbon by-products together with the heaviest tar fractions thereof are removed.

While any suitable method or combination of methods for removing solids and metals and the heavy tar fraction may be utilized, a particularly useful and efficient method is the ART SM treatment develped by Engelhard Corporation, the assignee of this application. This process utilizes an ARTCAT TM material to carry out an asphalt residual treatment process which is highly effective and efficient in treating heavy petroleum or other hydrocarbon containing fractions to render them suitable for processing to more valuable materials.

The ash and heavy tar removed via line 64 may be cycled to power plant 14 for combustion of the combustible values therein to supplement the coal supplied as fuel thereto. The thus-treated liquid hydrocarbon by-product is passed via line 66 through a heat exchanger 68 in which it is heated by indirect heat exchange as described below, and thence into a mixer 70.

An oxygen stream is transmitted from air separation zone 24 via lines 28, 72 and steam is transmitted from power plant 14 via lines 20, 74 through a heat exchanger 76 for indirect heat exchange as explained below, thence to mixer 70 wherein the oxygen, steam and treated liquid hydrocarbon by-product are admixed for transmission via line 78 as the inlet stream to an autothermal reformer 80.

In reformer 80 the mixture of hydrocarbon by-product, steam and oxygen is passed through a catalytic partial oxidation catalyst supported on a monolithic honeycomb carrier disposed within neck portion 80a of reformer 80. Some, but not all of the hydrocarbon is catalytically oxidized within the first catalyst zone contained within neck portion 80a and the heavier unoxidized hydrocarbons are hydrocracked to lighter constituents, mostly $C_1$ hydrocarbons, with a very minor amount of $C_2$ and $C_3$ hydrocarbons. Methane is the predominant hydrocarbon product attained by the hydrocracking. Depending on the specific nature of the hydrocarbon by-product fed to autothermal reformer 80 and the specific operating conditions utilized therein, the hydrocarbon by-product may be substantially entirely converted to a gaseous product containing $H_2$, $H_2O$, $CH_4$, CO and $CO_2$. However, under conditions in which a significant amount of heavier hydrocarbons would remain in the effluent from the first catalyst zone, a second catalyst zone may be disposed within main body portion 80b of reformer 80. In the second catalyst zone a steam reforming reaction is catalyzed to convert hydrocarbons to hydrogen and carbon oxides.

It is of course desired to provide a high methane content in the secondary SG. Therefore, the exit temperature of the gases exiting via line 82 is preferably controlled to reduce the amount of $C_2$ and $C_3$ compounds formed within reformer 80. For example, an outlet temperature at line 82 of about 1,400° F. (760° C.) has been found to be satisfactory to hydrocrack the material within the first catalyst zone to mostly $C_1$ hydrocarbons, i.e., CO, $CO_2$ and $CH_4$. A methanation step as described below, for reacting carbon monoxide and hydrogen to methane, is conveniently utilized in the process. It is therefore desirable to also control the conditions within reformer 80 to provide in the gas obtained therein a molar ratio of hydrogen to carbon monoxide of slightly more than 3:1, the molar ratio in which the two gases react to form methane and $H_2O$.

The effluent gas from reformer 80 is passed via line 82 through heat exchanger 76 to heat therein the oxygen and steam being transmitted via, respectively, lines 72 and 74 to mixer 70. The reformer effluent is then passed through heat exchanger 68 to heat the incoming liquid hydrocarbon by-product in line 66. The cooled reformer effluent is passed via line 82 to a quench zone 84 wherein the gas is cooled and water is separated therefrom via line 86. The cooled secondary SG is passed via line 88 to be introduced into line 40 to be admixed with the gasifier SG and the combined gases are then passed to gas purification zone 42 wherein acid gases, e.g., $CO_2$ and $H_2S$, are removed by known techniques and withdrawn via line 45. The purified combined gases are then passed to methanation zone 90 in which carbon monoxide contained therein is reacted with hydrogen to methane and $H_2O$, thereby increasing the overall methane content of the product synthesis gas which is withdrawn therefrom via line 92. It is this product, after drying to remove water, which is usually called "synthetic natural gas" or "SNG".

The following example exemplifies operating conditions and results obtained in treating a liquid hydrocarbon by-product which has been treated, as described above, for the removal of ash and heavy tars therefrom.

EXAMPLE 3

| Inlet Stream (78 in FIG. 2 Composition) | lb.-moles per hour | $O_2$ to C Ratio | $H_2O$ to C Ratio |
|---|---|---|---|
| (1) Feed-item (4) of Table II | 828 | 0.176 | 2.00 |
| (2) Steam | 18,216 | | |
| (3) Oxygen | 1,602 | | |

Temperature of Inlet Stream (78 in FIG. 2) = 800° F. (427° C.)
Pressure - 31 atmospheres.

| Effluent Gas (82 in FIG. 2) Composition | lb.-moles per hour |
|---|---|
| $H_2$ | 8,325 |
| $H_2O$ | 11,212 |
| $CH_4$ | 2,300 |
| CO | 2,679 |
| $CO_2$ | 4,229 |

Temperature of Effluent Gas (82 in FIG. 2) - 1,400° F. (760° C.)
Pressure of Effluent Gas = 30 atmospheres It will be seen that upon removal of $H_2O$ and $CO_2$, and conversion of CO and $H_2$ to $CH_4$ by methanation, a predominantly hydrogen and methane containing synthetic natural gas is obtained from the secondary SG to supplement the synthesis natural gas obtained from the gasifier SNG.

While the invention has been described in detail with respect to specific preferred embodiments thereof, it will be appreciated that those skilled in the art, upon reading and understanding of the foregoing will readily envision modifications and variations to the preferred embodiments which are nonetheless within the spirit and scope of the invention and of the claims.

What is claimed is:

1. In a coal gasification process in which coal is reacted with steam and oxygen to produce (i) a gasifier synthesis gas which is methanated to produce a synthetic natural gas, and (ii) a liquid hydrocarbon by-product, the improvement comprising preparing a secondary synthesis gas from said liquid hydrocarbon by-product and methanating the secondary synthesis gas, by the steps of:

(a) preheating an inlet stream comprising said liquid hydrocarbon by-product, $H_2O$, and oxygen to a preheat temperature at least sufficiently high to initiate catalytic oxidation of said hydrocarbon by-product as defined below, but less than about 1200° F. (649° C.);

(b) introducing the preheated inlet stream into a first catalyst zone comprising a monolithic body having a plurality of gas flow passages extending therethrough and having a catalytically effective amount of a platinum and palladium catalytic component dispersed therein, the amounts of hydrocarbon by-product, $H_2O$ and oxygen introduced into said first catalyst zone being controlled to maintain an $H_2O$ to C ratio of from about 0.5 to 5 and an $O_2$ to C ratio of from about 0.15 to 0.4 in said inlet stream;

(c) contacting the preheated inlet stream within said first catalyst zone with said platinum and palladium catalytic component to initiate and sustain therein catalytic oxidation of a quantity, less than all, of said hydrocarbon by-product sufficient to attain a temperature within said first catalyst zone at least high enough to crack substantially all unoxidized $C_5$ or heavier hydrocarbons in said by-product to $C_1$ to $C_4$ hydrocarbons, the temperature of at least a portion of said monolith being at least about 250° F. (139° C.) greater than the ignition temperature of said inlet stream, but not more than about 2000° F. (1093° C.), whereby to produce a first catalyst zone effluent comprising primarily methane, hydrogen, carbon monoxide, carbon dioxide and $H_2O$ and $C_2$-$C_4$ hydrocarbons;

(d) passing said effluent to a treatment zone for the removal of carbon dioxide and water therefrom;

(e) withdrawing the treated first catalyst zone effluent as a secondary synthesis gas; and (f) methanating said gasifier synthesis gas and said secondary synthesis gas to provide therefrom synthetic natural gas.

2. The process of claim 1 further including the step of passing said first catalyst zone effluent, while still at an elevated temperature, from said first catalyst zone to a second catalyst zone containing a steam reforming catalyst therein, and contacting the first zone effluent in said second catalyst zone with said steam reforming catalyst to react hydrocarbons therein with $H_2O$ to produce hydrogen and carbon oxides therefrom, and then passing the effluent of said second catalyst zone as said effluent to said treatment zone of step (d).

3. The process of claim 1 wherein at least about 50% by weight of said hydrocarbon by-product is converted to $C_1$ hydrocarbons in said first catalyst zone.

4. The process of claim 2 wherein a total of at least about 98% by weight of said hydrocarbon by-product is converted to $C_1$ hydrocarbons in said first and second catalyst zones.

5. The process of claim 2 wherein said steam reforming catalyst comprises a platinum group metal component.

6. The process of claim 1 or claim 2 wherein the temperature of said first catalyst zone effluent is at least about 1,400° F. (760° C.).

7. The process of claim 1 or claim 2 wherein said secondary synthetic natural gas is combined with said gasifier synthetic natural gas to provide a combined product synthetic natural gas.

8. The process of claim 1 or claim 2 wherein the preheat temperature is from about 800° F. to 1200° F. (427° C. to 649° C.).

9. The process of claim 2 wherein said first catalyst zone is maintained at a temperature of from about 1400° F. to 2000° F. (760° C. to 1093° C.) and the first zone effluent is introduced into said second catalyst zone at substantially the same temperature.

10. The process of claim 1 or claim 2 wherein a volumetric hourly rate of at least 100,000 volumes of throughput per volume of catalyst is maintained in said first catalyst zone.

11. The process of claim 2 wherein a volumetric hourly rate of at least 100,000 volumes of throughput per volume of catalyst is maintained in said first catalyst zone and a volumetric hourly rate of from about 2,000 to 20,000 volumes of throughput per volume of catalyst is maintained in said second catalyst zone.

12. The process of claim 1 or claim 2 wherein said platinum and palladium catalytic component of said first catalyst zone comprises a catalytically effective amount of palladium and platinum catalytic component and, optionally, rhodium catalytic component distended upon a refractory metal oxide support layer carried on said monolithic body.

13. The process of claim 12 wherein said catalytic components of said first catalyst zone comprise, on an elemental metal basis, about 10 to 90% by weight palladium and about 90 to 10% by weight platinum.

14. The process of claim 13 wherein said catalytic components of said first catalyst zone comprise about 25 to 75% by weight palladium, and about 75 to 25% by weight platinum.

15. The process of claim 2 wherein said steam reforming catalyst comprises a catalytically effective amount of rhodium and platinum catalytic components distended upon a refractory metal oxide support.

16. The process of claim 15 wherein said catalytic components of said steam reforming catalyst comprises, on an elemental metal basis, about 10 to 90% by weight rhodium, and about 90 to 10% by weight platinum.

17. The process of claim 16 wherein said catalytic components of said steam reforming zone comprise about 20 to 40% by weight rhodium and about 80 to 60% by weight platinum.

18. The process of claim 1 or claim 2 or claim 3 carried out at a pressure of from about 50 to 1500 psig.

19. In a coal gasification process in which coal is reacted with steam and oxygen to produce a gasifier synthesis gas and liquid hydrocarbon by-product, the improvement comprising preparing a secondary synthesis gas from said liquid hydrocarbon by-product by the steps of:

(a) preheating an inlet stream comprising said liquid hydrocarbon by-product, $H_2O$ and oxygen to a preheat temperature of from about 800° F. to 1200° F. (427° C. to 649° C.);

(b) introducing the preheated inlet stream into a first catalyst zone comprising a monolithic body having a plurality of gas flow passages extending therethrough and comprising a catalytically effective amount of palladium and platinum catalytic components dispersed therein, the amounts of hydrocarbon by-product, $H_2O$ and oxygen introduced into said first catalyst zone being controlled to maintain an $H_2O$ to C ratio from about 0.5 to 5 and an $O_2$ to C ratio of from about 0.15 to 0.4 in said inlet stream;

(c) contacting the preheated inlet stream within said first catalyst zone with said palladium and platinum catalytic components at a volumetric hourly rate of at least about 100,000 volumes of throughput per volume of catalyst per hour to initiate and sustain therein catalytic oxidation of a quantity, less than all, of said hydrocarbon by-product sufficient to attain a temperature within said first catalyst zone of from about 1400° F. to 2000° F. (760° C. to 1093° C.) and cracking substantially all unoxidized $C_5$ or heavier hydrocarbons in said by-product to a mixture of $C_1$ to $C_4$ hydrocarbons and predominating in $C_1$ hydrocarbons, whereby to produce a first catalyst zone effluent comprising methane, hydrogen, carbon monoxide, carbon dioxide and $H_2O$;

(d) passing said effluent to a treatment zone for the removal of carbon dioxide and water therefrom; and (e) withdrawing the treated first catalyst zone effluent as a secondary synthesis gas.

20. The process of claim 19 further including the step of passing said first catalyst zone effluent, while still at a temperature of from about 1400° F. to 2000° F. (760° C. to 1093° C.) from said first catalyst zone to a second catalyst zone containing a platinum group metal steam reforming catalyst therein, and contacting the first zone effluent in said second catalyst zone with said steam reforming catalyst at a volumetric hourly rate of from about 2,000 to 20,000 volumes of throughput per volume of catalyst per hour to react hydrocarbons therein with $H_2O$ to produce hydrogen and carbon oxides therefrom, and then passing the effluent of said second catalyst zone as said effluent to said treatment zone of step (d).

21. The process of claim 19 wherein at least about 50% by weight of said hydrocarbon by-product is converted to $C_1$ hydrocarbons in said first catalyst zone.

22. The process of claim 20 wherein a total of at least about 98% by weight of said hydrocarbon by-product is converted to $C_1$ hydrocarbons in said first and second catalyst zones.

23. The process of claim 19 or claim 20 wherein said first catalyst zone comprises palladium and platinum and, optionally, rhodium catalytic components distended upon a refractory metal oxide support layer carried on said monolithic body.

24. The process of claim 23 wherein said catalytic components of said first catalyst zone comprise, on an elemental metal basis, about 10 to 90% by weight palladium, and 90 to 10% by weight platinum.

25. The process of claim 24 wherein said catalytic components of said first catalyst comprise about 25 to 75% by weight palladium and 75 to 25% by weight platinum.

26. The process of claim 20 wherein said steam reforming catalyst comprises platinum and rhodium catalytic components distended upon a refractory metal oxide support.

27. The process of claim 26 wherein said catalytic components of said second catalyst zone comprise, on an elemental basis, about 10 to 90% by weight rhodium and 90 to 10% by weight platinum.

28. The process of claim 27 wherein said catalytic components of said second catalyst zone comprise about 20 to 40% by weight rhodium and 80 to 60% by weight platinum.

29. The process of claim 19 or claim 20 further including treating said liquid hydrocarbon by-product to remove solids, metals, and heavy tar therefrom prior to passing said by-product to said first catalyst zone.

30. The process of claim 29 further including methanating said secondary synthesis gas and said gasifier synthesis gas.

31. The process of claim 25 wherein said catalytic components of said first catalyst zone comprise about 40 to 60% by weight palladium, and about 60 to 40% by weight platinum.

* * * * *